United States Patent
Betz, III et al.

(10) Patent No.: US 7,933,787 B1
(45) Date of Patent: Apr. 26, 2011

(54) INSURANCE CREDIT MODEL

(75) Inventors: Andrew L Betz, III, Concord Township, OH (US); Dragos J. Mirza, Mentor, OH (US)

(73) Assignee: Farmers Insurance Exchange, Los Angeles, CA (US)

( * ) Notice: Subject to any disclaimer, the term of this patent is extended or adjusted under 35 U.S.C. 154(b) by 833 days.

(21) Appl. No.: 11/737,457

(22) Filed: Apr. 19, 2007

Related U.S. Application Data

(63) Continuation of application No. 11/558,221, filed on Nov. 9, 2006, now abandoned.

(51) Int. Cl.
*G06Q 40/00* (2006.01)
*G06Q 50/00* (2006.01)
(52) U.S. Cl. .............................................. 705/4; 705/35
(58) Field of Classification Search ........................ 705/4
See application file for complete search history.

(56) References Cited

U.S. PATENT DOCUMENTS

| | | | | |
|---|---|---|---|---|
| 5,548,758 | A | * | 8/1996 | Pirahesh et al. .................. 707/2 |
| 5,809,478 | A | * | 9/1998 | Greco et al. ....................... 705/4 |
| 6,163,770 | A | | 12/2000 | Gamble et al. |
| 6,298,348 | B1 | * | 10/2001 | Eldering ..................... 705/36 R |
| 7,099,843 | B1 | * | 8/2006 | Cassidy et al. .................. 705/38 |
| 2002/0188484 | A1 | | 12/2002 | Grover et al. |

OTHER PUBLICATIONS

Wu, Does Credit Score Really Explain Insurance Losses? Multivariate Analysis from a Data Mining Point of View, Proceedings of the Casualty Actuarial Society, 2003—casact.org.*
Miller, The Relationship Between Credit-Based Insurance Scores to Private Passenger Automobile Insurance Loss Propensity, 2003, IL: Epic Actuaries, LLC, http://www.ask-epic.com/Publications/Relationship%20of%20Credit%20Scores_062003.pdf.*
Fairlsaac, Predictiveness of Credit History for Insurance Loss Ratio Relativities, 1999.*
ConsumerReports.org; Prying the Lid Off Insurers' Secret Scoring Systems.
Here's the Score on Credit Scoring, Thompson, Connie, Jan. 30, 2002.
Insurance Score Models, State of Alaska, Division of Insurance, Department of Community and Economic Development.
Use of Credit Information by Insurers in Texas, Report to the 79th Legislature, Texas Department of Insurance, Dec. 30, 2004.

* cited by examiner

*Primary Examiner* — Luke Gilligan
*Assistant Examiner* — Tran Nguyen
(74) *Attorney, Agent, or Firm* — Benesch Friedlander Coplan & Aronoff LLP

(57) ABSTRACT

A system and method are disclosed for furnishing a quote for an insurance product for a user. In one embodiment, the method includes receiving a request from a user for a quote for an insurance product. The request includes an identification of a coverage option and a user identifier. Upon receipt of the request, the system retrieves user credit information based on the user identifier and selects one or more values from the user credit information associated with pre-selected variables related to the selected coverage option. The system then employs the values of the pre-selected variables to calculate a user's insurance credit score for the coverage option.

27 Claims, 12 Drawing Sheets

Figure 3A
(Prior Art)

| Age of Oldest Trade | Points |
|---|---|
| Group$_{A1}$ | P$_{A1}$ |
| Group$_{A2}$ | P$_{A2}$ |
| Group$_{A3}$ | P$_{A2}$ |

Figure 3B
(Prior Art)

| Age of User at Earliest Trade | Points |
|---|---|
| Group$_{B1}$ | P$_{B1}$ |
| Group$_{B2}$ | P$_{B2}$ |
| Group$_{B3}$ | P$_{B3}$ |

Figure 3C
(Prior Art)

| Age of Newest Trade | Points |
|---|---|
| Group$_{C1}$ | P$_{C1}$ |
| Group$_{C2}$ | P$_{C2}$ |
| Group$_{C3}$ | P$_{C3}$ |

Figure 3D
(Prior Art)

| Satisfactory Trades | Points |
|---|---|
| Group$_{D1}$ | P$_{D1}$ |
| Group$_{D2}$ | P$_{D2}$ |
| Group$_{D3}$ | P$_{D3}$ |

Figure 3E
(Prior Art)

| Trades With Delinquency Rating | Points |
|---|---|
| Group$_{E1}$ | P$_{E1}$ |
| Group$_{E2}$ | P$_{E2}$ |
| Group$_{E3}$ | P$_{E3}$ |

Figure 3F
(Prior Art)

| Months Since Most Recent Charge-Off | Points |
|---|---|
| Group$_{F1}$ | P$_{F1}$ |
| Group$_{F2}$ | P$_{F2}$ |
| Group$_{F3}$ | P$_{F3}$ |

Figure 3G
(Prior Art)

| Derogatory Trades | Points |
|---|---|
| $Group_{G1}$ | $P_{G1}$ |
| $Group_{G2}$ | $P_{G2}$ |
| $Group_{G3}$ | $P_{G3}$ |

Figure 3H
(Prior Art)

| Ratio of Revolving Trade to Total Credit | Points |
|---|---|
| $Group_{H1}$ | $P_{H1}$ |
| $Group_{H2}$ | $P_{H2}$ |
| $Group_{H3}$ | $P_{H3}$ |

Figure 3I
(Prior Art)

| Ratio of Balance to High Credit | Points |
|---|---|
| $Group_{I1}$ | $P_{I1}$ |
| $Group_{I2}$ | $P_{I2}$ |
| $Group_{I3}$ | $P_{I3}$ |

Figure 3J
(Prior Art)

| Trade Lines Opened in Last Year | Points |
|---|---|
| $Group_{G1}$ | $P_{J1}$ |
| $Group_{G2}$ | $P_{J2}$ |
| $Group_{G3}$ | $P_{J3}$ |

Figure 3K
(Prior Art)

| Months Since Last Revolving Trade Opened | Points |
|---|---|
| $Group_{K1}$ | $P_{K1}$ |
| $Group_{K2}$ | $P_{K2}$ |
| $Group_{K3}$ | $P_{K3}$ |

Figure 3L
(Prior Art)

| Number of Non-Insurance Inquiries | Points |
|---|---|
| $Group_{G1}$ | $P_{L1}$ |
| $Group_{G2}$ | $P_{L2}$ |
| $Group_{G3}$ | $P_{L3}$ |

Insurance Coverage Options

- Bodily Injury
  w1 * (score)

- Property Damage
  w2 * (score)

- Personal Injury Protection
  w3 * (score)

- Comprehensive
  w4 * (score)

- Collision
  w5 * (score)

- Combined Coverage
  w6 * (score)

| Bodily Injury | Variable 1 | $val_{1a}$ | $val_{1b}$ | $val_{1c}$ |
|---|---|---|---|---|
| | | $f_{1a}$ | $f_{1b}$ | $f_{1c}$ |
| | Variable 2 | $val_{2a}$ | $val_{2b}$ | $val_{2c}$ |
| | | $f_{2a}$ | $f_{2b}$ | $f_{2c}$ |
| | Variable 3 | $val_{3a}$ | $val_{3b}$ | $val_{3c}$ |
| | | $f_{3a}$ | $f_{3b}$ | $f_{3c}$ |

Figure 6B

| Property Damage | Variable 4 | $val_{4a}$ | $val_{4b}$ | $val_{4c}$ |
|---|---|---|---|---|
| | | $f_{4a}$ | $f_{4b}$ | $f_{4c}$ |
| | Variable 5 | $val_{5a}$ | $val_{5b}$ | $val_{5c}$ |
| | | $f_{5a}$ | $f_{5b}$ | $f_{5c}$ |
| | Variable 6 | $val_{6a}$ | $val_{6b}$ | $val_{6c}$ |
| | | $f_{6a}$ | $f_{6b}$ | $f_{6c}$ |

Figure 6C

| Personal Injury Protection | Variable 7 | $val_{7a}$ | $val_{7b}$ | $val_{7c}$ |
|---|---|---|---|---|
| | | $f_{7a}$ | $f_{7b}$ | $f_{7c}$ |
| | Variable 8 | $val_{8a}$ | $val_{8b}$ | $val_{8c}$ |
| | | $f_{8a}$ | $f_{8b}$ | $f_{8c}$ |
| | Variable 9 | $val_{9a}$ | $val_{9b}$ | $val_{9c}$ |
| | | $f_{9a}$ | $f_{9b}$ | $f_{9c}$ |

Figure 6D

| Comprehensive | Variable 10 | $val_{10a}$ | $val_{10b}$ | $val_{10c}$ |
|---|---|---|---|---|
| | | $f_{10a}$ | $f_{10b}$ | $f_{10c}$ |
| | Variable 11 | $val_{11a}$ | $val_{11b}$ | $val_{11c}$ |
| | | $f_{11a}$ | $f_{11b}$ | $f_{11c}$ |
| | Variable 12 | $val_{12a}$ | $val_{12b}$ | $val_{12c}$ |
| | | $f_{12a}$ | $f_{12b}$ | $f_{12c}$ |

Figure 6E

| Collision | Variable 13 | $val_{13a}$ | $val_{13b}$ | $val_{13c}$ |
|---|---|---|---|---|
| | | $f_{13a}$ | $f_{13b}$ | $f_{13c}$ |
| | Variable 14 | $val_{14a}$ | $val_{14b}$ | $val_{14c}$ |
| | | $f_{14a}$ | $f_{14b}$ | $f_{14c}$ |
| | Variable 15 | $val_{15a}$ | $val_{15b}$ | $val_{15c}$ |
| | | $f_{15a}$ | $f_{15b}$ | $f_{15c}$ |

Figure 6F

| Uninsured Motorist | Variable 16 | $val_{16a}$ | $val_{16b}$ | $val_{16c}$ |
|---|---|---|---|---|
| | | $f_{16a}$ | $f_{16b}$ | $f_{16c}$ |
| | Variable 17 | $val_{17a}$ | $val_{17b}$ | $val_{17c}$ |
| | | $f_{17a}$ | $f_{17b}$ | $f_{17c}$ |
| | Variable 18 | $val_{18a}$ | $val_{18b}$ | $val_{18c}$ |
| | | $f_{18a}$ | $f_{18b}$ | $f_{18c}$ |

Figure 6G

| | | | | |
|---|---|---|---|---|
| Liability | Variable 19 | $val_{19a}$ | $val_{19b}$ | $val_{19c}$ |
| | | $f_{19a}$ | $f_{19b}$ | $f_{19c}$ |
| | Variable 20 | $val_{20a}$ | $val_{20b}$ | $val_{20c}$ |
| | | $f_{20a}$ | $f_{20b}$ | $f_{20c}$ |
| | Variable 21 | $val_{21a}$ | $val_{21b}$ | $val_{21c}$ |
| | | $f_{21a}$ | $f_{21b}$ | $f_{21c}$ |

Figure 6H

| | | | | |
|---|---|---|---|---|
| Physical Damage | Variable 22 | $val_{22a}$ | $val_{22b}$ | $val_{22c}$ |
| | | $f_{22a}$ | $f_{22b}$ | $f_{22c}$ |
| | Variable 23 | $val_{23a}$ | $val_{23b}$ | $val_{23c}$ |
| | | $f_{23a}$ | $f_{23b}$ | $f_{23c}$ |
| | Variable 24 | $val_{24a}$ | $val_{24b}$ | $val_{24c}$ |
| | | $f_{24a}$ | $f_{24b}$ | $f_{24c}$ |

Figure 6I

| | | | | |
|---|---|---|---|---|
| Combined Coverage | Variable 25 | $val_{25a}$ | $val_{25b}$ | $val_{25c}$ |
| | | $f_{25a}$ | $f_{25b}$ | $f_{25c}$ |
| | Variable 26 | $val_{26a}$ | $val_{26b}$ | $val_{26c}$ |
| | | $f_{26a}$ | $f_{26b}$ | $f_{26c}$ |
| | Variable 27 | $val_{27a}$ | $val_{27b}$ | $val_{27c}$ |
| | | $f_{27a}$ | $f_{27b}$ | $f_{27c}$ |

Insurance Coverage Options

- Bodily Injury
  $100 * f_1 * f_2 * f_3$

- Property Damage
  $100 * f_4 * f_5 * f_6$

- Personal Injury Protection
  $100 * f_7 * f_8 * f_9$

- Comprehensive
  $100 * f_{10} * f_{11} * f_{12}$

- Collision
  $100 * f_{13} * f_{14} * f_{15}$

- Uninsured Motorist
  $100 * f_{16} * f_{17} * f_{18}$

- Liability
  $100 * f_{19} * f_{20} * f_{21}$

- Physical Damage
  $100 * f_{22} * f_{23} * f_{24}$

- Combined Coverage
  $100 * f_{25} * f_{26} * f_{27}$

Figure 7

INSURANCE CREDIT MODEL

CROSS REFERENCE TO RELATED APPLICATIONS

This application is a continuation of U.S. application Ser. No. 11/558,221 filed on Nov. 9, 2006, the disclosure of which is incorporated by reference herein in its entirety.

FIELD OF INVENTION

The present application relates to systems and methods for data processing and data management having particular utility in the field of insurance. More particularly, the present application relates to systems and methods for calculating an insurance credit score for an insurance coverage.

BACKGROUND

Online insurance quote systems are known in the art. Similarly, the practice of providing insurance quotes in person or over the telephone is well-known in the art. In the automobile insurance industry, several different types of coverage are available, including bodily injury coverage, property damage coverage, personal injury protection coverage, comprehensive coverage, collision coverage, and uninsured motorist coverage. These coverage types are sometimes referred to as line coverage. Additionally, some firms offer broader insurance coverage, such as liability coverage, sometimes referred to as BIPD coverage, which, broadly speaking, may be a hybrid of bodily injury coverage, property damage coverage, and personal injury coverage. Firms also offer physical damage coverage, sometimes referred to as PhysDam coverage, which, broadly speaking, may be a hybrid of collision coverage and comprehensive coverage. Further, firms also offer combined coverage, which includes all of the above described line coverages.

To calculate an automobile insurance quote, many factors are employed. For example, factors related to the insurance requester, such as age, gender, marital status, and driving record are assigned values or weights that are used in an insurance rate algorithm. Similarly, factors related to the vehicle such as model, retail price, and year are also assigned values or weights that are used in an insurance rate algorithm. The values or weights are assigned according to a correlation with loss costs due to accident and/or theft.

More recently, insurance companies have employed a credit score of the insurance requester as a factor for calculating an insurance quote. The credit score is weighted according to a correlation with loss costs due to accident and/or theft. Because the credit score calculated for insurance purposes is on a different scale from credit scores commonly used in other applications, the credit score is referred to as an "insurance credit score," or simply, an "insurance score."

BRIEF DESCRIPTION OF DRAWINGS

In the accompanying drawings, tables and flowcharts are illustrated that, together with the detailed description provided below, describe exemplary embodiments of the claimed invention. Like elements are identified with the same reference numerals.

It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, the drawings are not to scale and the proportion of certain elements may be exaggerated for the purpose of illustration.

FIGS. 3A-3L are tables illustrating exemplary lookup tables for point values for insurance scores;

FIG. 4 is a table illustrating exemplary prior art algorithms for calculating a discount for an insurance rate according to an insurance score;

FIGS. 6A-6I are tables illustrating exemplary lookup tables for values for an insurance score algorithm specific to a selected insurance coverage;

FIG. 7 is a table illustrating exemplary algorithms for calculating an insurance score specific to a selected insurance coverage;

DETAILED DESCRIPTION

"Logic," as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmed logic device, memory device containing instructions, or the like. Logic may also be fully embodied as software.

Figure 1:
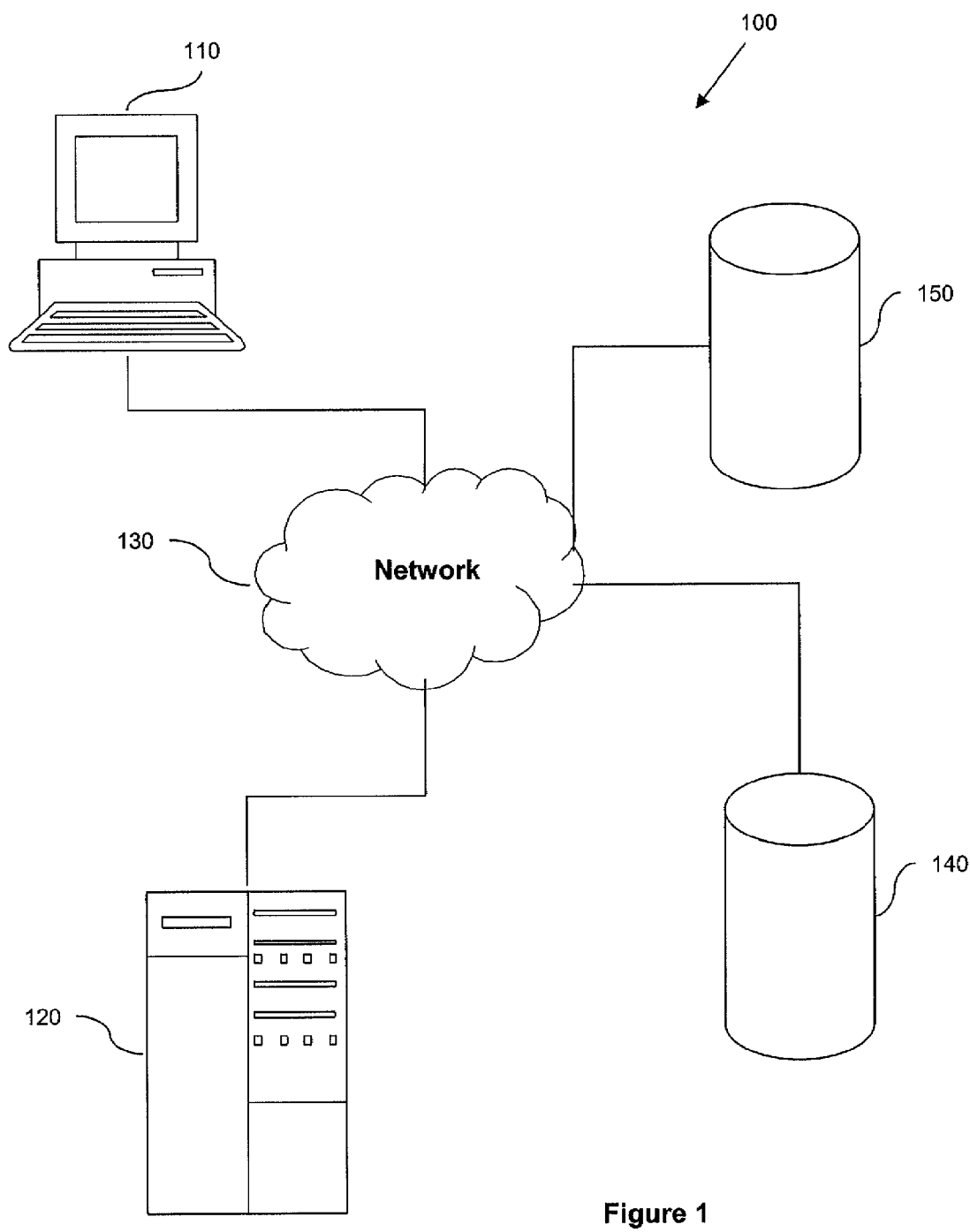
FIG. 1 is a schematic diagram illustrating one embodiment of an insurance quoting system.

FIG. 1 illustrates one embodiment of a system 100 for providing a quote for an insurance product. In the illustrated embodiment, a user 110 is in data communication with an insurance provider 120 through a network 130, such as an LAN, a WAN, the Internet, a wireless network, or any known telecommunications network. In an alternative embodiment (not shown), the user 110 may be directly connected to the insurance provider 120 through any known connections, such as copper wire, a telephone line, an Ethernet line, a USB connector, a Firewire connector, an IEEE 1394 connector, an RS-232 connector, a coaxial cable, an infrared transmission, radio frequency transmission, or Bluetooth transmission.

With continued reference to FIG. 1, the insurance provider 120 is in data communication with a first database 140 and a second database 150 through a secured connection. In the illustrated embodiment, the insurance provider 120 is in data communication with a first database 140 and a second database 150 through the network 130. In one embodiment, the first database 140 is a third party credit reporting agency database and the second database 150 is a third party vehicle information database. In an alternative embodiment (not shown), the insurance provider 120 may be directly connected to the first and second databases 140, 150 through one of: (1) a hard line, such as a telephone line, an Ethernet line, a USB connector, a Firewire connector, in IEEE 1394 connector, an RS-232 connector, a coaxial cable; (2) a wireless connection, such as an infrared, radio frequency, Bluetooth; or (3) any other known connections. In other alternative embodiments (not shown), the insurance provider 120 is in data communication with one or more additional databases, such as a traffic violations database, a criminal database, an address database, an accident database, or a DMV database.

As will be understood, the disclosed method of providing an insurance quote is not limited to the system 100 of FIG. 1. Alternative systems (not shown) include a human operator with access to the insurance provider 120. In such an alternative system, the operator is in communication with a user, either face to face, or via a telephone, email, instant message, facsimile, or any other known communication means. The operator may have direct access to the insurance provider 120, or may be connected through a network.

Figure 2:
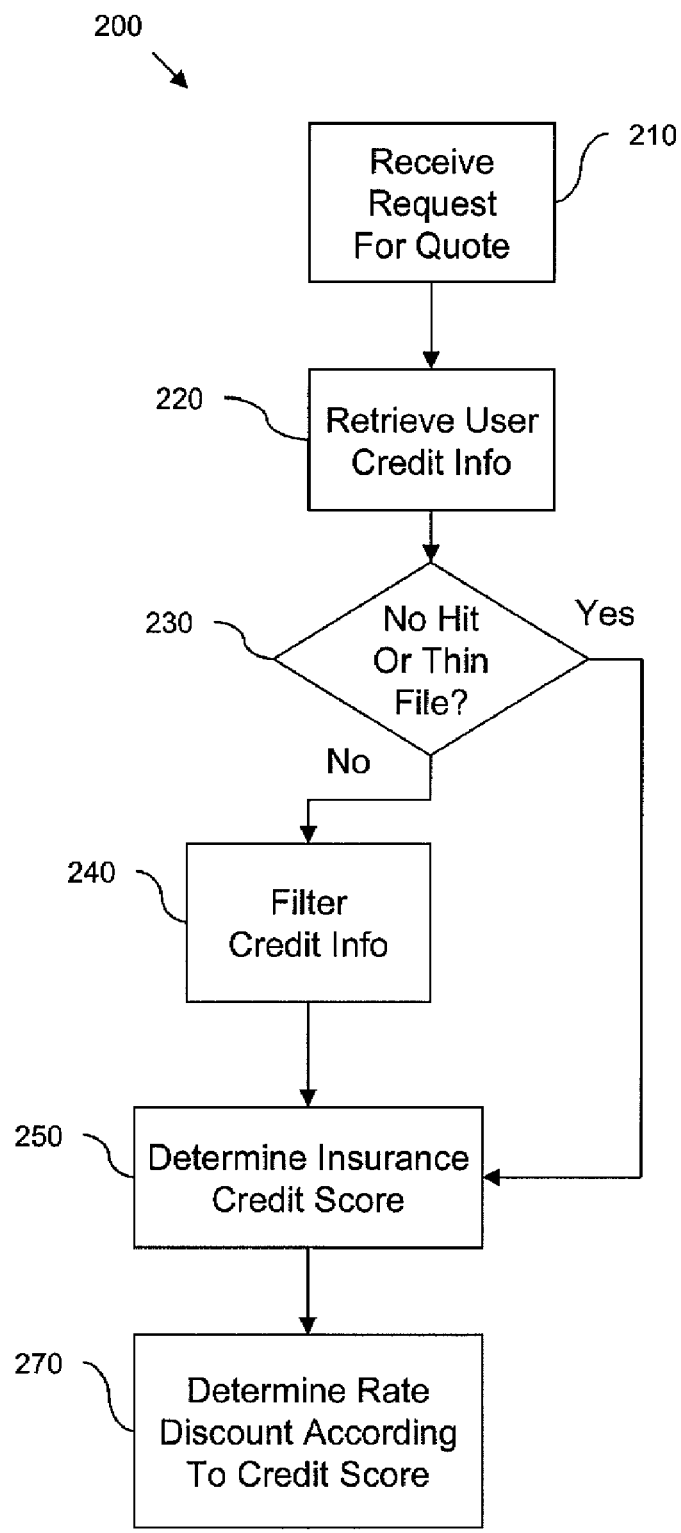
FIG. 2 is a flow chart illustrating exemplary prior art method steps for calculating a discount for an insurance rate according to an insurance score.

FIG. 2 illustrates a prior art method 200 for calculating a discount on an insurance rate based on a user's insurance score and according to an insurance coverage selection. In the illustrated embodiment, the insurance provider receives an insurance request from a user (step 210). Typically, the request includes a user identifier, such as a social security number. Upon receipt of the user information, the insurance provider retrieves user credit information (step 220). The insurance provider may request the credit information from a third party credit reporting agency, such as EQUIFAX®, EXPERIAN®, TRANSUNION$^{SM}$, or any other known credit reporting agency. Alternatively, the insurance provider may maintain its own credit information.

After requesting the user credit information, the insurance provider usually receives detailed credit information. For example, in one known embodiment, the third party credit report provides the information listed in Table 1 in the attached Appendix.

However, in some cases the insurance provider may receive an empty file (commonly referred to as a "no hit") or a file with very little credit information (commonly referred to as a "thin file"). Therefore, before proceeding, the insurance provider determines if it has received a no hit or a thin file (step 230). If the credit report includes adequate information, the insurance provider filters the credit information to retrieve values related to pre-selected variables (step 240). The pre-selected variables are independent of the coverage the user selects. In other words, the same variables are used for each insurance coverage selection.

After the credit information is filtered and the appropriate values retrieved, the values are used to determine an insurance score (step 250).

In one embodiment, the insurance provider employs lookup tables to retrieve a point total associated with the retrieved value. Exemplary lookup tables are illustrated in FIGS. 3A-3L. In the illustrated embodiment, the pre-selected variables were chosen to be the age of the user's oldest trade (FIG. 3A), the age of the user at the time of the earliest trade (FIG. 3B), the age of the user's newest trade (FIG. 3C), the number of satisfactory trades (FIG. 3D), the number of trades with delinquency ratings (FIG. 3E), the number of months since the user's most recent charge-off (FIG. 3F), the number of derogatory trades (FIG. 3G), the ratio of the user's revolving credit to total credit (FIG. 3H), the ratio of the user's total balances to the user's total high credit for all non-closed trades (FIG. 3I), the number of trade lines the user opened during the last year (FIG. 3J), the number of months since the user last opened a revolving trade (FIG. 3K), and the number of non-insurance inquiries made (FIG. 3L).

In the exemplary lookup tables, there are three groups of values associated with each variable. Turning to FIG. 3A as an example, if the age of the user's oldest trade fell within the range of Group$_{A1}$, the variable is assigned a point total of P$_{A1}$. Similarly, if the age of the user's oldest trade fell within the range of Group$_{B1}$, the variable is assigned a point total of P$_{B1}$. Further, if the age of the user's oldest trade fell within the range of Group$_{C1}$, the variable is assigned a point total of P$_{C1}$. In one known prior art embodiment, Group$_{A1}$ covers the range of 0-12 months and is associated with a point total P$_{A1}$ of 37 points; Group$_{B1}$ covers the range of 13-60 months and is associated with a point total P$_{B1}$ of 17 points; and Group$_{C1}$ covers the range of 61 months or more and is associated with a point total P$_{C1}$ of 0 points.

In the above described embodiment, point totals are assigned such that lower point totals indicate a better credit risk. In an alternative embodiment, point totals are assigned such that high point totals indicate a better credit risk. It should be understood that in alternative embodiments, different ranges of time may be associated with different point totals. It should further be understood that some variables may have fewer than three associated groups and other variables may have more than three associated groups.

After the point totals are determined, they are then inserted into an insurance score algorithm. For example, in embodiment, the point totals are simply summed together to generate an insurance score. In an alternative embodiment (not shown), the values are multiplied by various weights.

Referring back to FIG. 2, if the user's credit report is a no hit or a thin file, the insurance provider assigns a default insurance score to the user (step 250). On some occasions, the credit report may have adequate information related to certain variables, but may be missing data related to other variables. In such instances, a point total is retrieved from the lookup table for variables having adequate data, and a default point total is assigned for variables with missing data.

After an insurance score is determined, the insurance provider determines a rate discount (if any) to be applied to the insurance quote (step 260). In one embodiment (not shown), the rate discount is determined by employing a lookup table to retrieve a discount associated with the insurance score. In an alternative embodiment (not shown), the rate discount is determined by inserting the insurance score into an algorithm to calculate the discount. In another alternative embodiment, the insurance provider determines an additional premium (if any) to be applied to the insurance quote.

In one known embodiment, the rate discount is based on both an insurance score and a selected insurance coverage. FIG. 4 illustrates one exemplary rate discount algorithms specific to the selected coverage option. In the illustrated embodiment, a first weight w$_1$ is assigned to the bodily injury coverage, a second weight w$_2$ is assigned to the property damage coverage, a third weight w$_3$ is assigned to the personal injury protection coverage, a fourth weight w$_4$ is assigned to the comprehensive coverage, a fifth weight w$_5$ is assigned to the collision coverage, and a sixth weight w$_6$ is assigned to the combined coverage.

Figure 5:
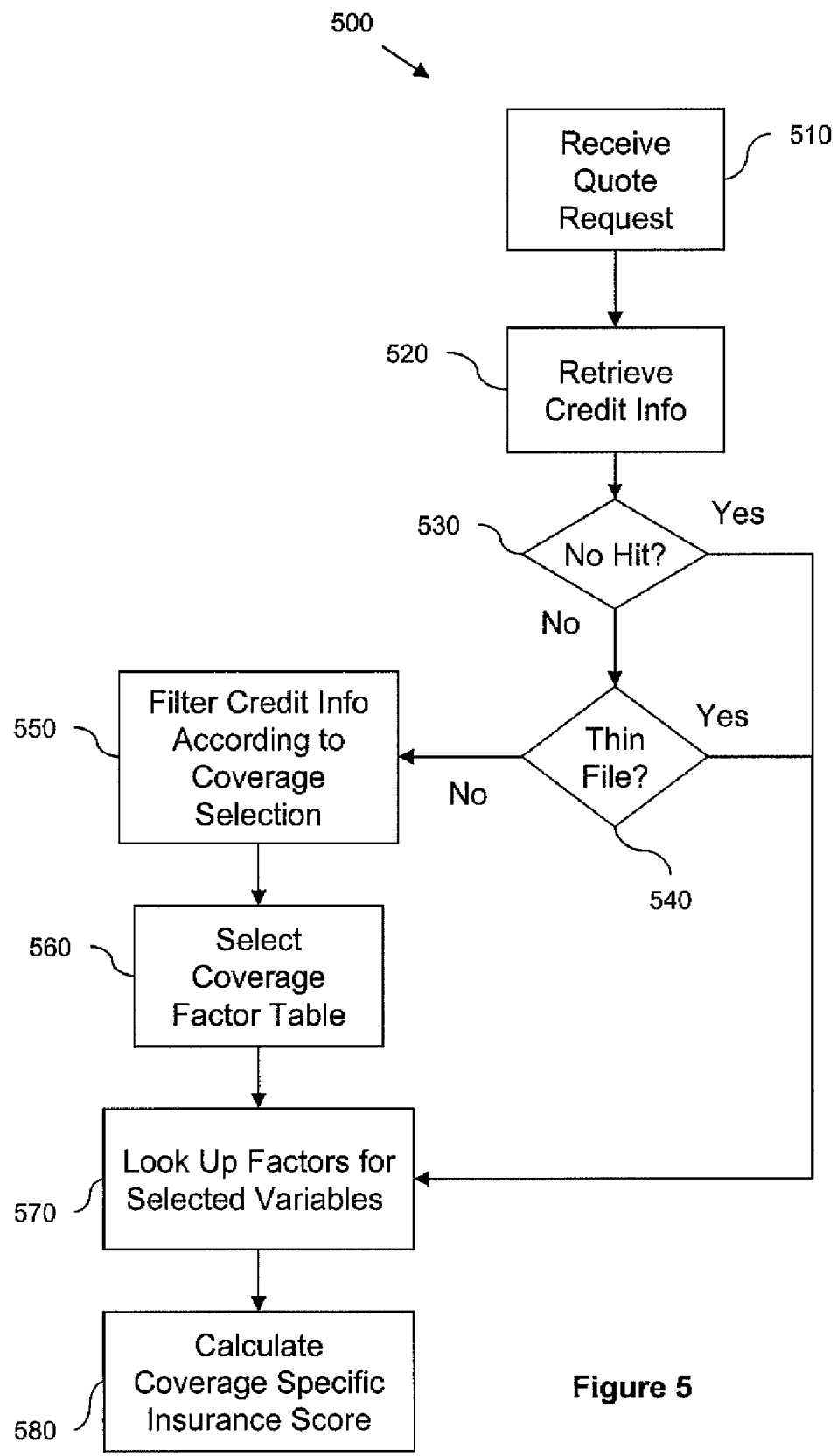
FIG. 5 is a flow chart illustrating one embodiment of method steps for calculating an insurance score specific to a selected insurance coverage.

FIG. 5 illustrates one embodiment of a method 500 for calculating an insurance score specific to a selected insurance coverage. First, the insurance provider receives a request for a quote for an insurance product from a user (step 510). The request includes an insurance coverage selection. Additionally, the request typically includes a user identifier, such as a social security number. Upon receipt of the user information, the insurance provider retrieves user credit information (step 520). The insurance provider may request the credit information from a third party credit reporting agency, such as EQUIFAX®, EXPERIAN®, TRANSUNION$^{SM}$, or any other known credit reporting agency. Alternatively, the insurance provider may maintain its own credit information.

After requesting the user credit information, the insurance provider usually receives detailed credit information. For example, in one known embodiment, the third party credit report provides the information described in Table 1 in the attached appendix. However, it should be understood that the variables listed in Table 1 are exemplary, and that any known credit variables may be included in a user's credit report. In an alternative embodiment (not shown), raw credit files may be used instead of a third party credit report.

Before proceeding, the insurance provider determines if it has received a no hit file (step 530). If the file is not a no hit file, the provider further determines if it has received a thin file (step 540). If the credit information is complete, the insurance provider filters the credit information to retrieve values related to pre-selected variables according to the selected insurance coverage (step 550). After the credit information is filtered and the appropriate values retrieved, a lookup table is selected that corresponds to the selected insurance coverage (step 560). Alternatively, an algorithm may be selected that corresponds to the selected insurance coverage.

After the lookup table is selected, weight factors are retrieved from the lookup table that correspond to the values associated with the pre-selected variables (step 570). If the user's credit information is a no hit or thin file, the insurance provider assigns a default insurance score to the user. On some occasions, the credit information may have adequate information related to certain variables, but may be missing data related to other variables. In such instances, a weight factor is retrieved from the lookup table for variables having adequate data, and a default weight factor is assigned for variables with missing data The weight factors are then used to calculate a coverage specific insurance score (step 580).

FIGS. 6A-6I illustrate exemplary lookup tables specific to a selected insurance coverage. As the tables illustrate, a pure premium for each insurance coverage is correlated to distinct variables. In the exemplary lookup tables, there are three variables associated with each insurance coverage. However, it should be understood that some insurance coverages may have more than three associated variables and some may have less than three associated variables.

The variables are correlated to the pure premium of the insurance coverage via a statistical analysis. In one known embodiment, the variables are selected by a forward selection process. In phase one of a forward selection process, a first model insurance score algorithm is created that uses the first of n available variables from a sample of credit information. A second model insurance score algorithm is then created that uses the second of in available variables from the sample of credit information. The process is then repeated until n model insurance score algorithms are created. The effectiveness of each model insurance score algorithm is then measured and the model with the lowest average squared error is used in phase two of the process.

In phase two, n-1 model algorithms are created, each containing the selected variable from phase one, plus one of the remaining n-1 variables. Again, the effectiveness of each model insurance score is measured and the model with the lowest average squared error is used in phase three of the process, provided its average squared error is also lower than that of the algorithm with only the originally selected variable. The process is repeated, until none of the remaining variables reduce the average squared error.

In an alternative embodiment, the variables are selected by a backward selection process. In a backward selection process, a first model insurance score algorithm is created that includes all of the n variables. Each variable is then removed, in turn, to determine if its removal effects the average squared error. After each variable is tested, the algorithm that produced the lowest average squared error is used in phase two, and the process is repeated until an algorithm is found that results in a lowest average squared error.

In other alternative embodiments, other known selection models may be employed. It should be understood that the lookup tables may be revised over time, employing the same described technique. As the sample sizes increase over time and as trends change, the lookup tables may be refined to include different variables.

The same process is used to select variables for each different insurance coverage selection. In one embodiment, some variables may correlate to the pure premiums of several different insurance coverages. In another embodiment, each insurance coverage may use variables that are distinct from the other insurance coverage selections. Further, the process of selecting credit-related variables may have to be revised based on state regulation. It is known that some states limit the types of credit variables that may be employed to generate insurance quotes. Therefore, state-specific algorithms may need to be formed.

In the exemplary lookup tables, there are three groups of values associated with each variable. Turning to FIG. 6A as an example, Variable 1 has three groups of associated values, $val_{1a}$, $val_{1b}$, and $val_{1c}$. Each of the three groups are assigned a weight factor $f_{1a}$, $f_{1b}$, and $f_{1c}$. The appropriate weight factor is chosen, according to the value from the user's credit report, and used in an insurance score algorithm.

FIG. 7 illustrates exemplary insurance score algorithms for each possible insurance coverage. Here, the selected weight factors are multiplied together and multiplied by an additional weight factor. In the illustrated embodiment, the additional weight factor is a factor of 100. In an alternative embodiment, no additional weight factors are used. It should be understood that such an algorithm is merely exemplary.

Figure 8:
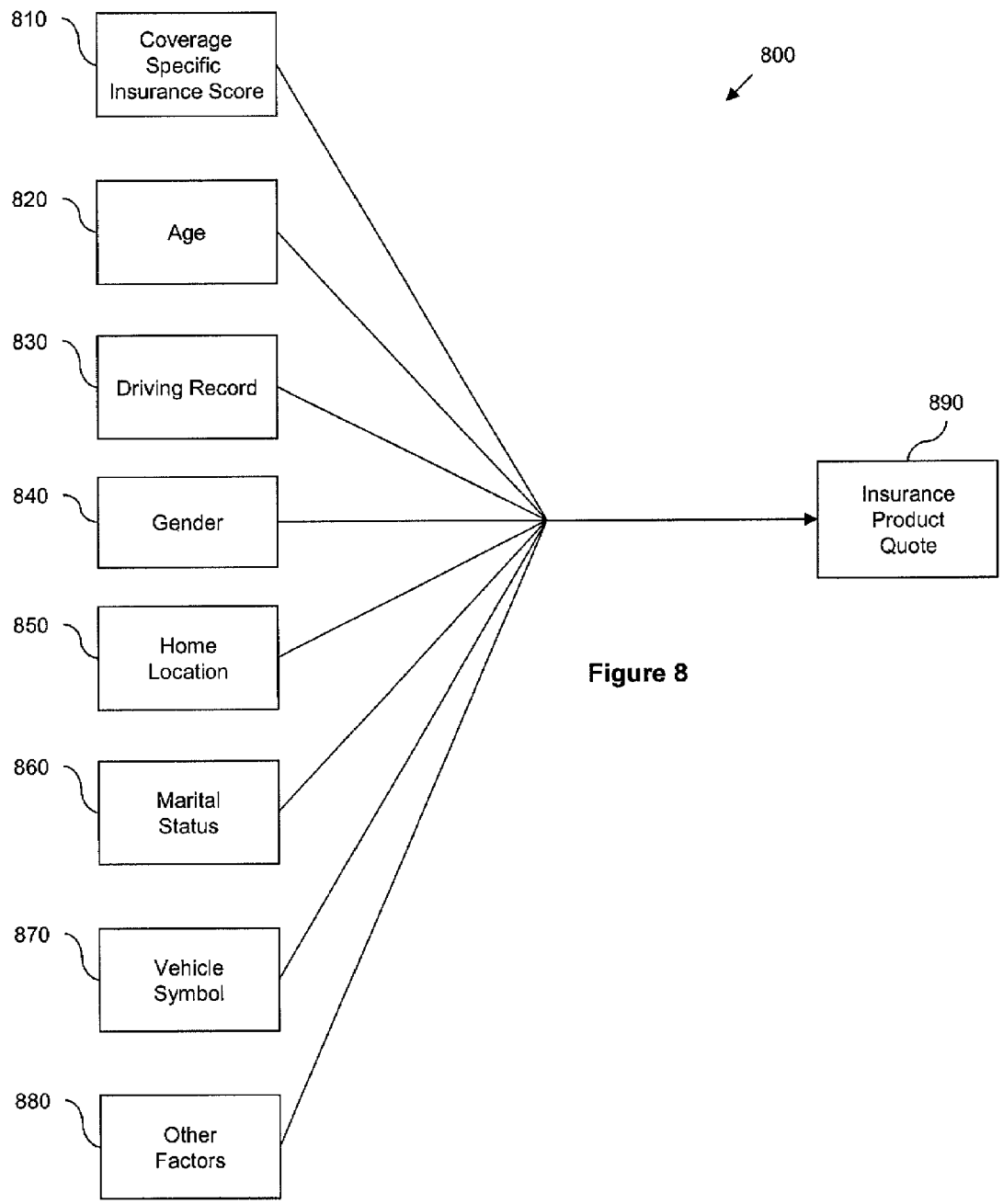
FIG. 8 is a block diagram illustrating a simplified diagrammatic representation of factors input into an insurance product quote calculation.

FIG. 8 illustrates a simplified diagrammatic representation 800 of factors input into an insurance product quote calculation. As shown in this illustration, after the generation of an insurance score, these scores are entered into an algorithm, along with other factors, to generate a quote on an insurance product. For example, the algorithm may include the coverage specific insurance score 810, the user's age 820, the user's driving record 830, the user's gender 840, the user's home location 850, the user's marital status 860, a vehicle symbol 870 based on the vehicle's characteristics, and other factors 880. After the factors are all input into an algorithm, they are appropriately weighted to generate an insurance product quote 890.

Figure 9:
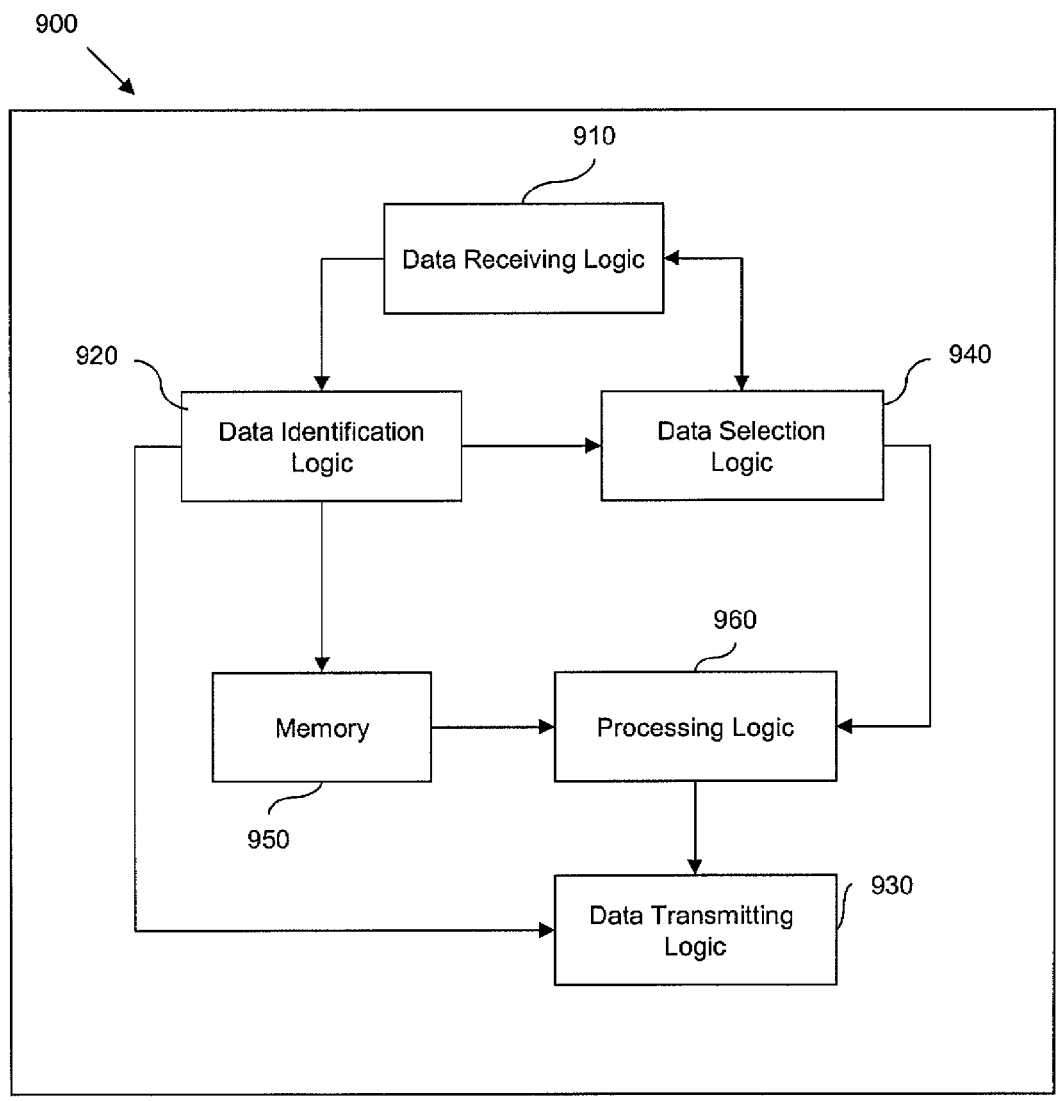
FIG. 9 is a schematic diagram illustrating a simplified schematic drawing for a processor for generating an insurance quote.

FIG. 9 illustrates a simplified diagrammatic drawing of one embodiment of a processor or system 900 for providing a quote for an insurance product. As shown in the illustrated embodiment, the system 900 includes data receiving logic 910 for receiving data from users and from third party database administrators. The data receiving logic 910 may be configured to receive data through a hard line, such as a telephone line, an Ethernet line, a USB connector, a Firewire connector, in IEEE 1394 connector, an RS-232 connector, or a coaxial cable; a wireless connection, such as an infrared, radio frequency, or Bluetooth; or any other known connections. The data receiving logic 910 is in data communication with data identification logic 920. The data identification logic 920 is configured to identify at least a user identifier and a user's insurance coverage selection. The data identification is in data communication with data transmitting logic 930, and is configured to instruct the data transmitting logic 930 to request data from third party database administrators or to request more information from the user.

The data identification logic 920 is also in data communication with data selection logic 940. When the data receiving logic 910 receives data from a third party database administrator, it transmits the data to the data selection logic 940 and to the data identification logic 920. The data identification logic identifies pre-selected variables associated with the selected insurance coverage by polling a memory 950. The memory 950 may be RAM, ROM, EPROM, EEPROM, Flash-EPROM, or any other known types of memory. After identifying the pre-selected variables, the data identification logic 920 instructs the data selection logic 940 to select values from the received data associated with the pre-selected variables.

In an insurance credit scoring embodiment, the received data is credit information and the data identification logic 920 identifies a data set of credit variables that have been pre-selected according to a correlation with a pure premium of the selected insurance coverage according to a statistical analysis. For example a first credit data set may be correlated with a pure premium for bodily injury coverage, a second credit data set may be correlated with a pure premium for property damage coverage, a third credit data set may be correlated with a pure premium for personal injury protection coverage, a fourth credit data set may be correlated with a pure premium for comprehensive coverage, a fifth credit data set may be correlated with a pure premium for collision coverage, a sixth credit data set may be correlated with a pure premium for uninsured motorist coverage, a seventh credit data set may be correlated with a pure premium for liability coverage, an eight credit data set may be correlated with a pure premium for physical damage coverage, and a ninth credit data set may be correlated with a pure premium for combined coverage. In one embodiment, some variables may be present in multiple data sets. For example, in one embodiment, the first credit data set and the second credit data set both include the age of the oldest trade. In an alternative embodiment, each credit data set includes distinct variables.

After the values are selected from the received data, processing logic 960 processes the values to generate a score, such as an insurance score, which is used to calculate a quote for an insurance product. The quote is then transmitted to the user via the data transmitting logic 930.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's claimed invention.

APPENDIX

TABLE 1

| Reference Number | Attribute Description |
|---|---|
| 3000 | Number Inquiries w/in 3 Months |
| 3001 | Number Inquiries w/in 12 Months |
| 3002 | Number Inquiries w/in 24 Months |
| 3100 | Number Trades |
| 3102 | Number Bankcard Trades |
| 3104 | Number Department Store Trades |
| 3105 | Number Installment Trades |
| 3109 | Number Revolving Trades |
| 3111 | Age Oldest Trade |
| 3113 | Age Oldest Bankcard Trade |
| 3116 | Age Oldest Installment Trade |
| 3117 | Age Oldest Mortgage Trade |
| 3119 | Age Oldest Retail Trade |
| 3120 | Age Oldest Revolving Trade |
| 3122 | Age Newest Trade |
| 3123 | Age Newest Auto Finance Trade |
| 3124 | Age Newest Bankcard Trade |
| 3126 | Age Newest Department Store Trades |
| 3127 | Age Newest Installment Trade |
| 3131 | Age Newest Retail Trade |
| 3132 | Age Newest Sales Finance Trade |
| 3133 | Number Trades Opened w/in 6 Months |
| 3134 | Number Revolving Trades Opened w/in 6 Months |
| 3135 | Number Trades Opened w/in 12 Months |
| 3136 | Number Installment Trades Opened w/in 12 Months |
| 3137 | Number Open Trades |
| 3138 | Number Open Auto Finance Trades |
| 3139 | Number Open Bankcard Trades |
| 3140 | Number Open Credit Union Trades |
| 3141 | Number Open Department Store Trades |
| 3142 | Number Open Installment Trades |
| 3143 | Number Open Mortgage Trades |
| 3144 | Number Open Personal Finance/Student Loan Trades |
| 3145 | Number Open Retail Trades |
| 3146 | Number Open Revolving Trades |
| 3147 | Number Open Sales Finance Trades |
| 3148 | Number Trades w/Update w/in 3 Months w/ Balance > $0 |
| 3150 | Number Bankcard Trades w/Update w/in 3 Months w/ Balance > $0 |
| 3152 | Number Department Store Trades w/Update w/in 3 Months w/ Balance > $0 |
| 3153 | Number Installment Trades w/Update w/in 3 Months w/ Balance > $0 |
| 3157 | Number Revolving Trades w/Update w/in 3 Months w/ Balance > $0 |
| 3159 | Total Balance Open Trades w/Update w/in 3 Months |
| 3160 | Total Balance Open Auto Finance Trades w/Update w/in 3 Months |
| 3161 | Total Balance Open Bankcard Trades w/Update w/in 3 Months |
| 3162 | Total Balance Open Credit Union Trades w/Update w/in 3 Months |
| 3163 | Total Balance Open Department Store Trades w/Update w/in 3 Months |
| 3164 | Total Balance Open Installment Trades w/Update w/in 3 Months |
| 3165 | Total Balance Open Mortgage Trades w/Update w/in 3 Months |
| 3166 | Total Balance Open Personal Finance/Student Loan Trades w/Update w/in 3 Months |
| 3167 | Total Balance Open Retail Trades w/Update w/in 3 Months |
| 3168 | Total Balance Open Revolving Trades w/Update w/in 3 Months |

TABLE 1-continued

| Reference Number | Attribute Description |
|---|---|
| 3169 | Total Balance Open Sales Finance Trades w/Update w/in 3 Months |
| 3181 | Total Balance Closed Trades w/Update w/in 3 Months |
| 3183 | Total Balance Closed Bankcard Trades w/Update w/in 3 Months |
| 3184 | Total Balance Closed Credit Union Trades w/Update w/in 3 Months |
| 3185 | Total Balance Closed Department Store Trades w/Update w/in 3 Months |
| 3188 | Total Balance Closed Personal Finance/Student Loan Trades w/Update w/in 3 Months |
| 3189 | Total Balance Closed Retail Trades w/Update w/in 3 Months |
| 3190 | Total Balance Closed Revolving Trades w/Update w/in 3 Months |
| 3191 | Total Balance Closed Sales Finance Trades w/Update w/in 3 Months |
| 3203 | Total Loan Amount Open Auto Finance Trades w/Update w/in 3 Months |
| 3204 | Total High Credit Open Bankcard Trades w/Update w/in 3 Months |
| 3205 | Total High Credit Open Department Store Trades w/Update w/in 3 Months |
| 3206 | Total Loan Amount Open Installment Trades w/Update w/in 3 Months |
| 3207 | Total Loan Amount Open Mortgage Trades w/Update w/in 3 Months |
| 3208 | Total High Credit Open Revolving Trades w/Update w/in 3 Months |
| 3215 | Number Trades w/ Past Due Amount > $0 |
| 3217 | Number Bankcard Trades w/ Past Due Amount > $0 |
| 3219 | Number Department Store Trades w/ Past Due Amount > $0 |
| 3223 | Number Retail Trades w/ Past Due Amount > $0 |
| 3224 | Number Revolving Trades w/ Past Due Amount > $0 |
| 3228 | Total Past Due Amount Bankcard Trades w/Update w/in 3 Months |
| 3231 | Total Past Due Amount Installment Trades w/Update w/in 3 Months |
| 3234 | Total Past Due Amount Retail Trades w/Update w/in 3 Months |
| 3235 | Total Past Due Amount Revolving Trades w/Update w/in 3 Months |
| 3236 | Total Past Due Amount Trades w/Update w/in 3 Months |
| 3237 | Total Past Due Amount |
| 3239 | Total Past Due Amount Bankcard Trades |
| 3242 | Total Past Due Amount Installment Trades |
| 3245 | Total Past Due Amount Retail Trades |
| 3246 | Total Past Due Amount Revolving Trades |
| 3257 | Number 30 Days Past Due Occurrences w/in 6 Months Revolving Trades |
| 3266 | Number 30 Days Past Due Occurrences w/in 12 Months Revolving Trades |
| 3268 | Number 30 Days Past Due Occurrences w/in 24 Months |
| 3270 | Number 30 Days Past Due Occurrences w/in 24 Months Bankcard Trades |
| 3272 | Number 30 Days Past Due Occurrences w/in 24 Months Department Store Trades |
| 3273 | Number 30 Days Past Due Occurrences w/in 24 Months Installment Trades |
| 3276 | Number 30 Days Past Due Occurrences w/in 24 Months Retail Trades |
| 3277 | Number 30 Days Past Due Occurrences w/in 24 Months Revolving Trades |
| 3285 | Number 60 Days Past Due Occurrences w/in 12 Months Retail Trades |
| 3286 | Number 60 Days Past Due Occurrences w/in 12 Months Revolving Trades |
| 3288 | Number 60 Days Past Due Occurrences w/in 24 Months |
| 3290 | Number 60 Days Past Due Occurrences w/in 24 Months Bankcard Trades |
| 3292 | Number 60 Days Past Due Occurrences w/in 24 Months Department Store Trades |
| 3293 | Number 60 Days Past Due Occurrences w/in 24 Months Installment Trades |
| 3296 | Number 60 Days Past Due Occurrences w/in 24 Months Retail Trades |
| 3297 | Number 60 Days Past Due Occurrences w/in 24 Months Revolving Trades |
| 3307 | Number 90 Days Past Due Occurrences w/in 24 Months |
| 3309 | Number 90 Days Past Due Occurrences w/in 24 Months Bankcard Trades |
| 3311 | Number 90 Days Past Due Occurrences w/in 24 Months Department Store Trades |
| 3312 | Number 90 Days Past Due Occurrences w/in 24 Months Installment Trades |
| 3315 | Number 90 Days Past Due Occurrences w/in 24 Months Retail Trades |
| 3316 | Number 90 Days Past Due Occurrences w/in 24 Months Revolving Trades |
| 3318 | Number 120-180 or More Days Past Due Occurrences w/in 24 Months |
| 3320 | Number 120-180 or More Days Past Due Occurrences w/in 24 Months Bankcard Trades |
| 3322 | Number 120-180 or More Days Past Due Occurrences w/in 24 Months Department Store Trades |
| 3323 | Number 120-180 or More Days Past Due Occurrences w/in 24 Months Installment Trades |
| 3326 | Number 120-180 or More Days Past Due Occurrences w/in 24 Months Retail Trades |
| 3327 | Number 120-180 or More Days Past Due Occurrences w/in 24 Months Revolving Trades |
| 3329 | Number Trades Satisfactory w/in 3 Months |
| 3330 | Number Bankcard Trades Satisfactory w/in 3 Months |
| 3332 | Number Department Store Trades Satisfactory w/in 3 Months |
| 3333 | Number Installment Trades Satisfactory w/in 3 Months |
| 3335 | Number Retail Trades Satisfactory w/in 3 Months |
| 3336 | Number Revolving Trades Satisfactory w/in 3 Months |
| 3338 | Number Trades Satisfactory w/in 6 Months |
| 3340 | Number Bankcard Trades Satisfactory w/in 6 Months |
| 3347 | Number Revolving Trades Satisfactory w/in 6 Months |
| 3368 | Number Trades Always Satisfactory |
| 3370 | Number Bankcard Trades Always Satisfactory |
| 3376 | Number Revolving Trades Always Satisfactory |
| 3379 | Number Trades Worst Rating 30 Days Past Due w/in 3 Months |
| 3380 | Number Bankcard Trades Worst Rating 30 Days Past Due w/in 3 Months |
| 3382 | Number Department Store Trades Worst Rating 30 Days Past Due w/in 3 Months |
| 3383 | Number Installment Trades Worst Rating 30 Days Past Due w/in 3 Months |
| 3385 | Number Retail Trades Worst Rating 30 Days Past Due w/in 3 Months |
| 3386 | Number Revolving Trades Worst Rating 30 Days Past Due w/in 3 Months |
| 3387 | Number Sales Finance Trades Worst Rating 30 Days Past Due w/in 3 Months |
| 3388 | Number Trades Worst Rating 60 Days Past Due w/in 3 Months |
| 3389 | Number Bankcard Trades Worst Rating 60 Days Past Due w/in 3 Months |
| 3391 | Number Department Store Trades Worst Rating 60 Days Past Due w/in 3 Months |
| 3392 | Number Installment Trades Worst Rating 60 Days Past Due w/in 3 Months |
| 3394 | Number Retail Trades Worst Rating 60 Days Past Due w/in 3 Months |
| 3395 | Number Revolving Trades Worst Rating 60 Days Past Due w/in 3 Months |
| 3396 | Number Sales Finance Trades Worst Rating 60 Days Past Due w/in 3 Months |
| 3397 | Number Trades Worst Rating 90 Days Past Due w/in 3 Months |
| 3398 | Number Bankcard Trades Worst Rating 90 Days Past Due w/in 3 Months |
| 3400 | Number Department Store Trades Worst Rating 90 Days Past Due w/in 3 Months |
| 3401 | Number Installment Trades Worst Rating 90 Days Past Due w/in 3 Months |
| 3403 | Number Retail Trades Worst Rating 90 Days Past Due w/in 3 Months |

TABLE 1-continued

| Reference Number | Attribute Description |
|---|---|
| 3404 | Number Revolving Trades Worst Rating 90 Days Past Due w/in 3 Months |
| 3405 | Number Sales Finance Trades Worst Rating 90 Days Past Due w/in 3 Months |
| 3406 | Number Trades Worst Rating 120-180 or More Days Past Due w/in 3 Months |
| 3407 | Number Bankcard Trades Worst Rating 120-180 or More Days Past Due w/in 3 Months |
| 3409 | Number Department Store Trades Worst Rating 120-180 or More Days Past Due w/in 3 Months |
| 3410 | Number Installment Trades Worst Rating 120-180 or More Days Past Due w/in 3 Months |
| 3412 | Number Retail Trades Worst Rating 120-180 or More Days Past Due w/in 3 Months |
| 3413 | Number Revolving Trades Worst Rating 120-180 or More Days Past Due w/in 3 Months |
| 3414 | Number Sales Finance Trades Worst Rating 120-180 or More Days Past Due w/in 3 Months |
| 3415 | Number Trades Worst Rating 30 Days Past Due w/in 6 Months |
| 3417 | Number Bankcard Trades Worst Rating 30 Days Past Due w/in 6 Months |
| 3419 | Number Department Store Trades Worst Rating 30 Days Past Due w/in 6 Months |
| 3420 | Number Installment Trades Worst Rating 30 Days Past Due w/in 6 Months |
| 3422 | Number Personal Finance/Student Loan Trades Worst Rating 30 Days Past Due w/in 6 Months |
| 3423 | Number Retail Trades Worst Rating 30 Days Past Due w/in 6 Months |
| 3424 | Number Revolving Trades Worst Rating 30 Days Past Due w/in 6 Months |
| 3425 | Number Sales Finance Trades Worst Rating 30 Days Past Due w/in 6 Months |
| 3426 | Number Trades Worst Rating 60 Days Past Due w/in 6 Months |
| 3428 | Number Bankcard Trades Worst Rating 60 Days Past Due w/in 6 Months |
| 3430 | Number Department Store Trades Worst Rating 60 Days Past Due w/in 6 Months |
| 3431 | Number Installment Trades Worst Rating 60 Days Past Due w/in 6 Months |
| 3433 | Number Personal Finance/Student Loan Trades Worst Rating 60 Days Past Due w/in 6 Months |
| 3434 | Number Retail Trades Worst Rating 60 Days Past Due w/in 6 Months |
| 3435 | Number Revolving Trades Worst Rating 60 Days Past Due w/in 6 Months |
| 3436 | Number Sales Finance Trades Worst Rating 60 Days Past Due w/in 6 Months |
| 3437 | Number Trades Worst Rating 90 Days Past Due w/in 6 Months |
| 3439 | Number Bankcard Trades Worst Rating 90 Days Past Due w/in 6 Months |
| 3441 | Number Department Store Trades Worst Rating 90 Days Past Due w/in 6 Months |
| 3442 | Number Installment Trades Worst Rating 90 Days Past Due w/in 6 Months |
| 3444 | Number Personal Finance/Student Loan Trades Worst Rating 90 Days Past Due w/in 6 Months |
| 3445 | Number Retail Trades Worst Rating 90 Days Past Due w/in 6 Months |
| 3446 | Number Revolving Trades Worst Rating 90 Days Past Due w/in 6 Months |
| 3447 | Number Sales Finance Trades Worst Rating 90 Days Past Due w/in 6 Months |
| 3448 | Number Trades Worst Rating 120-180 or More Days Past Due w/in 6 Months |
| 3450 | Number Bankcard Trades Worst Rating 120-180 or More Days Past Due w/in 6 Months |
| 3452 | Number Department Store Trades Worst Rating 120-180 or More Days Past Due w/in 6 Months |
| 3453 | Number Installment Trades Worst Rating 120-180 or More Days Past Due w/in 6 Months |
| 3455 | Number Personal Finance/Student Loan Trades Worst Rating 120-180 or More Days Past Due w/in 6 Months |
| 3456 | Number Retail Trades Worst Rating 120-180 or More Days Past Due w/in 6 Months |
| 3457 | Number Revolving Trades Worst Rating 120-180 or More Days Past Due w/in 6 Months |
| 3458 | Number Sales Finance Trades Worst Rating 120-180 or More Days Past Due w/in 6 Months |
| 3535 | Number Trades Worst Rating Ever 30 Days Past Due |
| 3536 | Number Auto Finance Trades Worst Rating Ever 30 Days Past Due |
| 3537 | Number Bankcard Trades Worst Rating Ever 30 Days Past Due |
| 3539 | Number Department Store Trades Worst Rating Ever 30 Days Past Due |
| 3540 | Number Installment Trades Worst Rating Ever 30 Days Past Due |
| 3544 | Number Revolving Trades Worst Rating Ever 30 Days Past Due |
| 3546 | Number Trades Worst Rating 60 Ever Days Past Due |
| 3547 | Number Auto Finance Trades Worst Rating Ever 60 Days Past Due |
| 3548 | Number Bankcard Trades Worst Rating Ever 60 Days Past Due |
| 3550 | Number Department Store Trades Worst Rating Ever 60 Days Past Due |
| 3551 | Number Installment Trades Worst Rating Ever 60 Days Past Due |
| 3555 | Number Revolving Trades Worst Rating Ever 60 Days Past Due |
| 3557 | Number Trades Worst Rating Ever 90 Days Past Due |
| 3558 | Number Auto Finance Trades Worst Rating Ever 90 Days Past Due |
| 3559 | Number Bankcard Trades Worst Rating Ever 90 Days Past Due |
| 3561 | Number Department Store Trades Worst Rating Ever 90 Days Past Due |
| 3562 | Number Installment Trades Worst Rating Ever 90 Days Past Due |
| 3566 | Number Revolving Trades Worst Rating Ever 90 Days Past Due |
| 3568 | Number Trades Worst Rating Ever 120-180 or More Days Past Due |
| 3569 | Number Auto Finance Trades Worst Rating Ever 120-180 or More Days Past Due |
| 3570 | Number Bankcard Trades Worst Rating Ever 120-180 or More Days Past Due |
| 3572 | Number Department Store Trades Worst Rating Ever 120-180 or More Days Past Due |
| 3573 | Number Installment Trades Worst Rating Ever 120-180 or More Days Past Due |
| 3577 | Number Revolving Trades Worst Rating Ever 120-180 or More Days Past Due |
| 3579 | Worst Rating w/in 3 Months Auto Finance Trades |
| 3580 | Worst Rating w/in 3 Months Mortgage Trades |
| 3581 | Number Trades w/ Major Derogatory Reported w/in 6 Months |
| 3583 | Number Bankcard Trades w/ Major Derogatory Reported w/in 6 Months |
| 3585 | Number Department Store Trades w/ Major Derogatory Reported w/in 6 Months |
| 3586 | Number Installment Trades w/ Major Derogatory Reported w/in 6 Months |
| 3589 | Number Retail Trades w/ Major Derogatory Reported w/in 6 Months |
| 3590 | Number Revolving Trades w/ Major Derogatory Reported w/in 6 Months |
| 3592 | Number Trades w/ Major Derogatory Event w/in 24 Months |
| 3593 | Number Auto Finance Trades w/ Major Derogatory Event w/in 24 Months |
| 3594 | Number Bankcard Trades w/ Major Derogatory Event w/in 24 Months |
| 3596 | Number Department Store Trades w/ Major Derogatory Event w/in 24 Months |
| 3597 | Number Installment Trades w/ Major Derogatory Event w/in 24 Months |
| 3598 | Number Mortgage Trades w/ Major Derogatory Event w/in 24 Months |

TABLE 1-continued

| Reference Number | Attribute Description |
|---|---|
| 3600 | Number Retail Trades w/ Major Derogatory Event w/in 24 Months |
| 3601 | Number Revolving Trades w/ Major Derogatory Event w/in 24 Months |
| 3602 | Number Sales Finance Trades w/ Major Derogatory Event w/in 24 Months |
| 3603 | Number Trades Major Derogatory |
| 3605 | Number Bankcard Trades Major Derogatory |
| 3607 | Number Department Store Trades Major Derogatory |
| 3608 | Number Installment Trades Major Derogatory |
| 3611 | Number Retail Trades Major Derogatory |
| 3612 | Number Revolving Trades Major Derogatory |
| 3614 | Number Trades w/ Unpaid Major Derogatory Event w/in 24 Months |
| 3616 | Number Bankcard Trades w/ Unpaid Major Derogatory Event w/in 24 Months |
| 3618 | Number Department Store Trades w/ Unpaid Major Derogatory Event w/in 24 Months |
| 3619 | Number Installment Trades w/ Unpaid Major Derogatory Event w/in 24 Months |
| 3622 | Number Retail Trades w/ Unpaid Major Derogatory Event w/in 24 Months |
| 3623 | Number Revolving Trades w/ Unpaid Major Derogatory Event w/in 24 Months |
| 3624 | Number Sales Finance Trades w/ Unpaid Major Derogatory Event w/in 24 Months |
| 3625 | Number Trades Unpaid Major Derogatory |
| 3627 | Number Bankcard Trades Unpaid Major Derogatory |
| 3629 | Number Department Store Trades Unpaid Major Derogatory |
| 3630 | Number Installment Trades Unpaid Major Derogatory |
| 3633 | Number Retail Trades Unpaid Major Derogatory |
| 3634 | Number Revolving Trades Unpaid Major Derogatory |
| 3723 | Number Open Retail Trades w/Update w/in 3 Months w/ Balance >= 50% High Credit |
| 3724 | Number Open Revolving Trades w/Update w/in 3 Months w/ Balance >= 50% High Credit |
| 3725 | Number Open Auto Finance Trades w/Update w/in 3 Months w/ Balance >= 75% Loan Amount |
| 3726 | Number Open Bankcard Trades w/Update w/in 3 Months w/ Balance >= 75% High Credit |
| 3727 | Number Open Department Store Trades w/Update w/in 3 Months w/ Balance >= 75% High Credit |
| 3728 | Number Open Installment Trades w/Update w/in 3 Months w/ Balance >= 75% Loan Amount |
| 3729 | Number Open Mortgage Trades w/Update w/in 3 Months w/ Balance >= 75% Loan Amount |
| 3746 | Subjects Age |
| 3900 | Percent Satisfactory Bankcard Trades to Total Bankcard Trades |
| 3901 | Percent Satisfactory Revolving Trades to Total Revolving Trades |
| 3902 | Bankruptcy w/in 24 Months Flag |
| 3903 | Bankruptcy Flag |
| 3904 | Foreclosure w/in 24 Months Flag |
| 3905 | Foreclosure Flag |
| 3907 | Number 3rd Party Collections w/in 12 Months |
| 3908 | Number 3rd Party Collections w/in 24 Months |
| 3909 | Number 3rd Party Collections |
| 3911 | Total Collection Amount 3rd Party Collections w/in 12 Months |
| 3912 | Total Collection Amount 3rd Party Collections w/in 24 Months |
| 3913 | Total Collection Amount 3rd Party Collections |
| 3747 | Number Trades Reported w/in 3 Months |
| 3748 | Number Bankcard Trades Reported w/in 3 Months |
| 3749 | Number Department Store Trades Reported w/in 3 Months |
| 3750 | Number Installment Trades Reported w/in 3 Months |
| 3751 | Number Revolving Trades Reported w/in 3 Months |
| 3752 | Number Trades Reported w/in 6 Months |
| 3753 | Number Bankcard Trades Reported w/in 6 Months |
| 3754 | Number Revolving Trades Reported w/in 6 Months |
| 3755 | Age Newest Date Last Activity Trades Paid as Agreed |
| 3756 | Age Newest Date Last Activity Bankcard Trades Paid as Agreed |
| 3757 | Age Newest Date Last Activity Installment Trades Paid as Agreed |
| 3758 | Age Newest Date Last Activity Revolving Trades Paid as Agreed |
| 3759 | Age Newest Date Last Activity Trades Other Than Paid as Agreed |
| 3760 | Age Newest Date Last Activity Bankcard Trades Other Than Paid as Agreed |
| 3761 | Age Newest Date Last Activity Installment Trades Other Than Paid as Agreed |
| 3762 | Age Newest Date Last Activity Revolving Trades Other Than Paid as Agreed |
| 3812 | Age Newest Tax Lien Public Record Item |
| 3813 | Age Newest Judgment Public Record Item |
| 3825 | Percent of Bankcard Trades to All Trades |
| 3826 | Percent of Department Store Trades to All Trades |
| 3827 | Percent of Installment Trades to All Trades |
| 3828 | Percent of Revolving Trades to All Trades |
| 3829 | Percent of Bankcard Trades to All Revolving Trades |
| 3830 | Percent of Open Department Store Trades to All Open Retail Trades |
| 3831 | Percent of Open Bankcard Trades to All Open Revolving Trades |
| 3832 | Percent of Open Trades to All Trades |
| 3833 | Percent of Open Bankcard Trades to All Bankcard Trades |
| 3834 | Percent of Open Department Store Trades to All Department Store Trades |
| 3835 | Percent of Open Installment Trades to All Installment Trades |
| 3836 | Percent of Open Revolving Trades to All Revolving Trades |
| 3837 | Percent of Open Bankcard Trades to All Open Trades |
| 3838 | Percent of Open Credit Union Trades to All Open Trades |
| 3839 | Percent of Open Department Store Trades to All Open Trades |
| 3840 | Percent of Open Installment Trades to All Open Trades |
| 3841 | Percent of Open Retail Trades to All Open Trades |
| 3842 | Percent of Open Revolving Trades to All Open Trades |
| 3843 | Percent of Trades Opened within 6 Months to All Trades |
| 3844 | Percent of Trades Opened within 12 Months to All Trades |
| 3845 | Percent of Revolving Trades Opened within 6 Months to All Revolving Trades |
| 3846 | Total Balance with Update within 3 Months |
| 3847 | Total Balance Bankcard Trades with Update within 3 Months |
| 3848 | Total Balance Credit Union Trades with Update within 3 Months |
| 3849 | Total Balance Department Store Trades with Update within 3 Months |
| 3850 | Total Balance Personal Finance Trades with Update within 3 Months |
| 3851 | Total Balance Retail Trades with Update within 3 Months |
| 3852 | Total Balance Revolving Trades with Update within 3 Months |
| 3853 | Total Balance Sales Finance Trades with Update within 3 Months |
| 3854 | Percent of Balance to High Credit Open Bankcard Trades with Update within 3 Months |
| 3855 | Percent of Balance to High Credit Open Department Store Trades with Update within 3 Months |
| 3856 | Percent of Balance to High Credit Open Revolving Trades with Update within 3 Months |
| 3857 | Percent of Balance to Total Loan Amount Open Auto Finance Trades with Update within 3 Months |
| 3858 | Percent of Balance to Total Loan Amount Open Installment Trades with Update within 3 Months |
| 3859 | Percent of Balance to Total Loan Amount Open Mortgage Trades with Update within 3 Months |
| 3860 | Percent of Total Past Due Amount to Total Balance Bankcard Trades with Update within 3 Months |
| 3861 | Percent of Total Past Due Amount to Total Balance Retail Trades with Update within 3 Months |
| 3862 | Percent of Total Past Due Amount to Total Balance Revolving Trades with Update within 3 Months |
| 3863 | Percent of Total Past Due Amount to Total Balance All Trades with Update within 3 Months |
| 3864 | Percent of Trades Always Satisfactory to All Trades |
| 3865 | Percent of Trades Satisfactory within 3 Months to All Trades Reported 3 Months |

TABLE 1-continued

| Reference Number | Attribute Description |
|---|---|
| 3866 | Percent of Bankcard Trades Satisfactory within 3 Months to All Bankcard Trades Reported 3 Months |
| 3867 | Percent of Department Store Trades Satisfactory within 3 Months to All Department Store Trades Reported 3 Months |
| 3868 | Percent of Installment Trades Satisfactory within 3 Months to All Installment Trades Reported 3 Months |
| 3869 | Percent of Revolving Trades Satisfactory within 3 Months to All Revolving Trades Reported 3 Months |
| 3870 | Number of Trades 60 Days or Worse within 3 Months or Major Derogatory Event within 24 Months |
| 3871 | Number of Trades 90 Days or Worse within 3 Months or Major Derogatory Event within 24 Months |
| 3872 | Number of Trades 120 Days or Worse within 3 Months or Major Derogatory Event within 24 Months |
| 3873 | Number of Bankcard Trades 60 Days or Worse within 3 Months or Major Derogatory Event within 24 Months |
| 3874 | Number of Bankcard Trades 90 Days or Worse within 3 Months or Major Derogatory Event within 24 Months |
| 3875 | Number of Trades 120 Days or Worse within 3 Months or Major Derogatory Event within 24 Months |
| 3876 | Number of Department Store Trades 60 Days or Worse within 3 Months or Major Derogatory Event within 24 Months |
| 3877 | Number of Department Store Trades 90 Days or Worse within 3 Months or Major Derogatory Event within 24 Months |
| 3878 | Number of Department Store Trades 120 Days or Worse within 3 Months or Major Derogatory Event within 24 Months |
| 3879 | Number of Installment Trades 60 Days or Worse within 3 Months or Major Derogatory Event within 24 Months |
| 3880 | Number of Installment Trades 90 Days or Worse within 3 Months or Major Derogatory Event within 24 Months |
| 3881 | Number of Installment Trades 120 Days or Worse within 3 Months or Major Derogatory Event within 24 Months |
| 3882 | Number of Retail Trades 60 Days or Worse within 3 Months or Major Derogatory Event within 24 Months |
| 3883 | Number of Retail Trades 90 Days or Worse within 3 Months or Major Derogatory Event within 24 Months |
| 3884 | Number of Retail Trades 120 Days or Worse within 3 Months or Major Derogatory Event within 24 Months |
| 3885 | Number of Revolving Trades 60 Days or Worse within 3 Months or Major Derogatory Event within 24 Months |
| 3886 | Number of Revolving Trades 90 Days or Worse within 3 Months or Major Derogatory Event within 24 Months |
| 3887 | Number of Revolving Trades 120 Days or Worse within 3 Months or Major Derogatory Event within 24 Months |
| 3888 | Number of Trades No Worse than 59 Days within 3 Months |
| 3889 | Number of Bankcard Trades No Worse than 59 Days within 3 Months |
| 3890 | Number of Department Store Trades No Worse than 59 Days within 3 Months |
| 3891 | Number of Installment Trades No Worse than 59 Days within 3 Months |
| 3892 | Number of Retail Trades No Worse than 59 Days within 3 Months |
| 3893 | Number of Revolving Trades No Worse than 59 Days within 3 Months |
| 3894 | Percent Trades Worst Rating 60 Days Past Due or Worse w/in 3 Months or Major Derogatory Event w/in 24 Months to Trades Reported w/in 3 Months |
| 3895 | Percent Trades Worst Rating 90 Days Past Due or Worse w/in 3 Months or Major Derogatory Event w/in 24 Months to Trades Reported w/in 3 Months |
| 3896 | Percent of Trades 120-180 or More Days or Worse within 3 Months or Major Derogatory Event within 24 Months to All Trades |
| 3897 | Percent Bankcard Trades Worst Rating 60 Days Past Due or Worse w/in 3 Months or Major Derogatory Event w/in 24 Months to Bankcard Trades Reported w/in 3 Months |
| 3898 | Percent Bankcard Trades Worst Rating 90 Days Past Due or Worse w/in 3 Months or Major Derogatory Event w/in 24 Months to Bankcard Trades Reported w/in 3 months |
| 3899 | Percent Bankcard Trades Worst Rating 120-180 or More Days Past Due or Worse w/in 3 Months or Major Derogatory Event w/in 24 Months to Bankcard Trades Reported w/in 3 Months |
| 3914 | Percent Revolving Trades Worst Rating 60 Days Past Due or Worse w/in 3 Months or Major Derogatory Event w/in 24 Months to Revolving Trades Reported w/in 3 Months |
| 3915 | Percent Revolving Trades Worst Rating 90 Days Past Due or Worse w/in 3 Months or Major Derogatory Event w/in 24 Months to Revolving Trades Reported w/in 3 Months |
| 3916 | Percent Revolving Trades Worst Rating 120-180 or More Days Past Due or Worse w/in 3 Months or Major Derogatory Event w/in 24 Months to Revolving Trades Reported w/in 3 Months |
| 3917 | Number of Trades 60 Days or Worse within 6 Months or Major Derogatory Event within 24 Months |
| 3918 | Number of Trades 90 Days or Worse within 6 Months or Major Derogatory Event within 24 Months |
| 3919 | Number of Trades 120 Days or Worse within 6 Months or Major Derogatory Event within 24 Months |
| 3920 | Number of Bankcard Trades 60 Days or Worse within 6 Months or Major Derogatory Event within 24 Months |
| 3921 | Number of Bankcard Trades 90 Days or Worse within 6 Months or Major Derogatory Event within 24 Months |
| 3922 | Number of Bankcard Trades 120 Days or Worse within 6 Months or Major Derogatory Event within 24 Months |
| 3923 | Number of Department Store Trades 60 Days or Worse wtihin 6 Months or Major Derogatory Event within 24 Months |
| 3924 | Number of Department Store Trades 90 Days or Worse wtihin 6 Months or Major Derogatory Event within 24 Months |
| 3925 | Number of Department Store Trades 120 Days or Worse within 6 Months or Major Derogatory Event within 24 Months |
| 3926 | Number of Installment Trades 60 Days or Worse within 6 Months or Major Derogatory Event within 24 Months |
| 3927 | Number of Installment Trades 90 Days or Worse within 6 Months or Major Derogatory Event within 24 Months |
| 3928 | Number of Installment Trades 120 Days or Worse within 6 Months or Major Derogatory Event within 24 Months |
| 3929 | Number of Retail Trades 60 Days or Worse within 6 Months or Major Derogatory Event within 24 Months |
| 3930 | Number of Retail Trades 90 Days or Worse within 6 Months or Major Derogatory Event within 24 Months |
| 3931 | Number of Retail Trades 120 Days or Worse within 6 Months or Major Derogatory Event within 24 Months |
| 3932 | Number of Revolving Trades 60 Days or Worse within 6 Months or Major Derogatory Event within 24 Months |
| 3933 | Number of Revolving Trades 90 Days or Worse within 6 Months or Major Derogatory Event within 24 Months |
| 3934 | Number of Revolving Trades 120 Days or Worse within 6 Months or Major Derogatory Event within 24 Months |
| 3935 | Number of Trades No Worse Than 59 Days within 6 Months |
| 3936 | Number of Bankcard Trades No Worse Than 59 Days within 6 Months |
| 3937 | Number of Revolving Trades No Worse than 59 Days within 6 Months |
| 3938 | Percent of Trades Satisfactory within 6 Months to All Trades Reported 6 Months |
| 3939 | Percent of Bankcard Trades Satisfactory within 6 Months to All Bankcard Trades Reported 6 Months |
| 3940 | Percent of Revolving Trades Satisfactory within 6 Months to All Revolving Trades Reported 6 Months |
| 3941 | Percent Trades Worst Rating 60 Days Past Due or Worse w/in 6 Months or Major Derogatory Event w/in 24 Months to Trades Reported w/in 6 Months |
| 3942 | Percent Trades Worst Rating 90 Days Past Due or Worse w/in 6 Months or Major Derogatory Event w/in 24 Months to Trades Reported w/in 6 Months |
| 3943 | Percent Trades Worst Rating 120-180 or More Days Past Due or Worse w/in 6 Months or Major Derogatory Event w/in 24 Months to Trades Reported w/in 6 Months |
| 3944 | Percent Bankcard Trades Worst Rating 60 Days Past Due or Worse w/in 6 Months or Major Derogatory Event w/in 24 Months to Bankcard Trades Reported w/in 6 Months |

TABLE 1-continued

| Reference Number | Attribute Description |
|---|---|
| 3945 | Percent Bankcard Trades Worst Rating 90 Days Past Due or Worse w/in 6 Months or Major Derogatory Event w/in 24 Months to Bankcard Trades Reported w/in 6 Months |
| 3946 | Percent Bankcard Trades Worst Rating 120-180 or More Days Past Due or Worse w/in 6 Months or Major Derogatory Event w/in 24 Months to Bankcard Trades Reported w/in 6 Months |
| 3947 | Percent Revolving Trades Worst Rating 60 Days Past Due or Worse w/in 6 Months or Major Derogatory Event w/in 24 Months to Revolving Trades Reported w/in 6 Months |
| 3948 | Percent Revolving Trades Worst Rating 90 Days Past Due or Worse w/in 6 Months or Major Derogatory Event w/in 24 Months to Revolving Trades Reported w/in 6 Months |
| 3949 | Percent Revolving Trades Worst Rating 120-180 or More Days Past Due or Worse w/in 6 Months or Major Derogatory Event w/in 24 Months to Revolving Trades Reported w/in 6 Months |
| 3950 | Number of Trades Worst Rating Ever 60 Days or Worse |
| 3951 | Number of Trades Worst Rating Ever 90 Days or Worse |
| 3952 | Number of Trades Worst Rating Ever 120 Days or Worse |
| 3953 | Number of Bankcard Trades Worst Rating Ever 60 Days or Worse |
| 3954 | Number of Bankcard Trades Worst Rating Ever 90 Days or Worse |
| 3955 | Number of Bankcard Trades Worst Rating Ever 120 Days or Worse |
| 3956 | Number of Department Store Trades Worst Rating Ever 60 Days or Worse |
| 3957 | Number of Department Store Trades Worst Rating Ever 90 Days or Worse |
| 3958 | Number of Department Store Trades Worst Rating Ever 120 Days or Worse |
| 3959 | Number of Installment Trades Worst Rating Ever 60 Days or Worse |
| 3960 | Number of Installment Trades Worst Rating Ever 90 Days or Worse |
| 3961 | Number of Installment Trades Worst Rating Ever 120 Days or Worse |
| 3962 | Number of Revolving Trades Worst Rating Ever 60 Days or Worse |
| 3963 | Number of Revolving Trades Worst Rating Ever 90 Days or Worse |
| 3964 | Number of Revolving Trades Worst Rating Ever 120 Days or Worse |
| 3965 | Number of Trades Worst Rating Ever No Worse than 59 Days |
| 3966 | Number of Bankcard Trades Worst Rating Ever No Worse than 59 Days |
| 3967 | Number of Revolving Trades Worst Rating Ever No Worse than 59 Days |
| 3968 | Percent of Trades Worst Rating Ever 60 Days or Worse to All Trades |
| 3969 | Percent of Trades Worst Rating Ever 90 Days or Worse to All Trades |
| 3970 | Percent of Trades Worst Rating Ever 120 Days or Worse to All Trades |
| 3971 | Percent of Trades Major Derogatory to All Trades |
| 3972 | Percent of Trades Unpaid Major Derogatory to All Trades |
| 3973 | Percent of Bankcard Trades Worst Rating Ever 60 Days or Worse to All Bankcard Trades |
| 3974 | Percent of Bankcard Trades Worst Rating Ever 90 Days or Worse to All Bankcard Trades |
| 3975 | Percent of Bankcard Trades Worst Rating Ever 120 Days or Worse to All Bankcard Trades |
| 3976 | Percent of Bankcard Trades Major Derogatory to All Bankcard Trades |
| 3977 | Percent of Bankcard Trades Unpaid Major Derogatory to All Bankcard Trades |
| 3978 | Percent of Revolving Trades Worst Rating Ever 60 Days or Worse to All Revolving Trades |
| 3979 | Percent of Revolving Trades Worst Rating Ever 90 Days or Worse to All Revolving Trades |
| 3980 | Percent of Revolving Trades Worst Rating Ever 120 Days or Worse to All Revolving Trades |
| 3981 | Percent of Revolving Trades Major Derogatory to All Revolving Trades |
| 3982 | Percent of Revolving Trades Unpaid Major Derogatory to All Revolving Trades |
| 3983 | Percent of Trades with Major Derogatory Event within 24 Months to All Trades |
| 3984 | Percent of Bankcard Trades with Major Derogatory Event within 24 Months to All Bankcard Trades |
| 3985 | Percent of Department Store Trades with Major Derogatory Event within 24 Months to All Department Store Trades |
| 3986 | Percent of Installment Trades with Major Derogatory Event within 24 Months to All Installment Trades |
| 3987 | Percent of Revolving Trades with Major Derogatory Event within 24 Months to All Revolving Trades |

The invention claimed is:

1. A method of furnishing a quote for an automobile insurance product for a user comprising:
receiving a request from a user for a quote for an automobile insurance product, wherein the request includes a user identifier and an identification of a coverage option selected from the group consisting of bodily injury, property damage, personal injury protection, comprehensive, collision, uninsured motorist, liability, physical damage, and combined coverage;
retrieving user credit information based on the user identifier, the user credit information having a plurality of attributes, each attribute having a value, wherein each coverage option is associated with a subset of attributes;
selecting from the user credit information the values of the subset of attributes associated with the identified coverage option;
generating by a computer weight factors associated with the selected values;
inputting the selected values and the weight factors into an insurance credit score algorithm to calculate by a computer a user insurance credit score for the selected coverage option;
inputting the calculated user insurance credit score into an insurance quote algorithm to calculate by a computer a quote for the automobile insurance product; and
providing the quote for the automobile insurance product to the user.

2. The method of claim 1, further comprising pre-selecting attributes associated with each coverage option according to a statistical analysis.

3. The method of claim 2, further comprising populating a look-up table associated with a coverage option according to a statistical analysis.

4. The method of claim 3, further comprising refining the look-up table associated with the coverage option according to a statistical analysis.

5. The method of claim 2, wherein the statistical analysis includes a forward selection analysis.

6. The method of claim 2, wherein the statistical analysis includes a backward selection analysis.

7. The method of claim 2, further comprising refining the pre-selected attributes associated with each coverage option according to a statistical analysis.

8. The method of claim 1, further comprising selecting a look up table associated with the selected coverage option.

9. The method of claim 1, wherein the coverage option is a line coverage option.

10. The method of claim 1, further comprising receiving additional information related to at least one of age, marital status, gender, location, automobile symbol, and driving record and inputting the additional information into the insurance quote algorithm.

11. The method of claim 1, wherein the plurality of attributes include at least one of an age of an oldest trade, an age of the individual when an earliest reported trade line was opened, a number of months since a most recent automobile trade was opened, a percentage of bankcard trades that are in satisfactory status, a number of collections on file excluding those with a medical industry code, a ratio of a number of trades with a past due amount to a total number of trades, a presence of a foreclosure, a presence of an open mortgage trade, a presence of personal finance trades, a ratio of revolving credit balances to a credit limit on revolving accounts, a ratio of total credit balances to a credit limit on all accounts, a ratio of a number of revolving trades to a number of total trades, a number of inquiries in the last 24 months, and a percentage of trades opened within the last 12 months to total trades.

12. Computer implemented steps for generating insurance data using a computed insurance score comprising:
receiving an identifier for an individual and a selection from a group of automobile line coverage options;
retrieving credit information for the identified individual, the credit information having a plurality of attributes, each attribute having a value;
identifying at least one pre-selected attribute associated with the selected automobile line coverage option;
retrieving the at least one value from the credit information associated with the at least one pre-selected attribute;
computing by a computer an insurance score with the at least one retrieved value according to a pre-selected algorithm associated with the selected automobile line coverage option; and
generating insurance data at an output device using the computed insurance score.

13. The computer implemented steps of claim 12, wherein the step of generating insurance data includes inputting into an insurance algorithm the computed insurance score and at least one score associated with one of an individual's age, marital status, gender, location, and driving record.

14. The computer implemented steps of claim 13, wherein the insurance algorithm includes a pre-selected weight for each of the at least one score associated with one of an individual's age, marital status, gender, location, and driving record.

15. The computer implemented steps of claim 12, wherein the insurance data is related to automobile insurance and the selected automobile line coverage option is one of bodily injury coverage, property damage coverage, personal injury protection coverage, comprehensive coverage, collision coverage, and combined coverage.

16. The computer implemented steps of claim 12, wherein plurality of attributes include at least one of an age of an oldest trade, an age of the individual when an earliest reported trade line was opened, a number of months since a most recent automobile trade was opened, a percentage of bankcard trades that are in satisfactory status, a number of collections on file excluding those with a medical industry code, a ratio of a number of trades with a past due amount to a total number of trades, a presence of a foreclosure, a presence of an open mortgage trade, a presence of personal finance trades, a ratio of revolving credit balances to a credit limit on revolving accounts, a ratio of total credit balances to a credit limit on all accounts, a ratio of a number of revolving trades to a number of total trades, a number of inquiries in the last 24 months, and a percentage of trades opened within the last 12 months to total trades.

17. The computer implemented steps of claim 12, wherein the pre-selected algorithm associated with the selected automobile line coverage option includes a pre-selected weight associated with each of the pre-selected attributes.

18. A tangible computer-readable medium comprising:
data receiving logic configured to receive data corresponding to an automobile insurance line coverage selection and user credit information;
data selection logic configured to select some, but not all, of the data from the user credit information according to the automobile insurance line coverage selection; and
data processing logic configured to generate an insurance credit score according to the selected data from the user credit information and the automobile insurance line coverage selection.

19. The computer-readable medium of claim 18, further comprising data identification logic configured to identify a plurality of data sets from the user credit information, including at least a first data set associated with a first insurance coverage selection and second data set associated with a second insurance coverage selection.

20. The computer-readable medium of claim 19, wherein the first data set includes at least one datum that is not included in the second data set.

21. The computer-readable medium of claim 19, wherein the first data set includes at least one datum that is included in the second data set.

22. The computer-readable medium of claim 19, wherein each of the plurality of data sets includes at least one of an age of an oldest trade, an age of the individual when an earliest reported trade line was opened, a number of months since a most recent automobile trade was opened, a percentage of bankcard trades that are in satisfactory status, a number of collections on file excluding those with a medical industry code, a ratio of a number of trades with a past due amount to a total number of trades, a presence of a foreclosure, a presence of an open mortgage trade, a presence of personal finance trades, a ratio of revolving credit balances to a credit limit on revolving accounts, a ratio of total credit balances to a credit limit on all accounts, a ratio of a number of revolving trades to a number of total trades, a number of inquiries in the last 24 months, and a percentage of trades opened within the last 12 months to total trades.

23. The computer-readable medium of claim 18, further comprising data transmitting logic configured to transmit the insurance coverage quote to a user.

24. The computer-readable medium of claim 23, wherein the data receiving logic is further configured to receive a user social security number and the data transmitting logic is further configured to transmit the user social security number to a third party credit reporting agency.

25. The computer-readable medium of claim 18, wherein the automobile insurance line coverage selection is one of bodily injury coverage, property damage coverage, personal injury protection coverage, comprehensive coverage, collision coverage, and combined coverage.

26. The computer-readable medium of claim 18, wherein the data processing logic is further configured to generate an insurance coverage quote according to the insurance credit score.

27. The computer-readable medium of claim 18, wherein the data processing logic is further configured to select a look up table associated with the automobile insurance line coverage selection, the look up table having a plurality of attributes, each attribute having at least one weight factor associated with a range of values.

* * * * *